Patented Dec. 30, 1952

2,623,839

UNITED STATES PATENT OFFICE 2,623,839

SPERMICIDAL COMPOSITIONS

Abraham Taub, New York, N. Y., assignor to Julius Schmid, Inc., New York, N. Y., a corporation of New York No Drawing. Application November 21, 1950, Serial No. 196,960

14 Claims. (Cl. 167—58)

The present invention relates to an improved spermicidal composition. This application is a continuation-in-part of my application Serial No. 609,323, filed August 6, 1945, for Spermicidal Composition, now abandoned.

It is well known that heretofore various spermicidal compositions have been used. Of the various types heretofore employed, the diaphragm and jelly method appeared to be the most acceptable and the most desirable. However, certain disadvantages have been encountered, the most serious of which was the long time required to destroy the sperm, lack of efficacy due to physical shortcomings of the jelly, the irritation of the delicate vaginal mucosa, and other undesirable features. Many attempts have been made to overcome these disadvantages, but none, so far as I am aware, has been wholly successful and satisfactory in actual practice.

I have discovered that the problem confronting the art can be solved, and that the disadvantages can be overcome by an improved spermicidal composition involving a unique combination of substances which is a departure from the teachings of the prior art. As those skilled in the art are aware, the prior art taught that a spermicidal composition could be made by adding to a semi-solid base an agent selected from the group consisting of acids, alkalies, oxidizing agents, or other classes of chemical substances having germicidal, coagulating, or membrane-penetrating properties. However, the very properties of these prior art compositions, which tended to destroy sperm, inherently tended to affect detrimentally and irritate the dilicate vaginal mucosa.

It is an object of the present invention to provide a novel spermicidal composition containing a diester which can effectively destroy the sperm within relatively short periods of time without irritation of the delicate vaginal mucosa and without other detrimental effects.

It is another object of the invention to provide a novel spermicidal composition having an adequate consistency for mechanical barrier action and which has effective adhesiveness, good spreading power, and miscibility with the vaginal and sperm secretions.

Another object of the invention is to provide an improved spermicidal jelly composition which is effective within a relatively short period of time without irritating delicate body membranes in which the spermicidal agent consists of fatty acid diesters of polyoxyethylene glycols of the generic formula $$CH_2OR_a(CH_2OCH_2)_xCH_2OR_b$$

in which "$x$" is an integer of at least 2, "$R_a$" is the acyl radical of a fatty acid having at least six carbon atoms and "$R_b$" is the acyl radical of a fatty acid having at least six carbon atoms, which may be the same or different from that of "$R_a$," and which may be used in either an acid or an alkaline solution in combination with a water dispersible thickening agent having adhesive action and a humectant plasticizing agent, and which is adapted for use in an aqueous vehicle.

It is a still further object of the present invention to provide a novel spermicidal composition which is easily applied and which is esthetically acceptable to the user with respect to color, odor, and general appearance.

A further object of the invention is to provide a novel spermicidal composition which does not melt or flow out of body cavities at body temperatures and which is water washable for removal thereof.

Moreover, it is a further object of the invention to provide a novel spermicidal composition which is non-toxic, non-irritant and non-staining.

Other objects and advantages of the invention will become apparent from the following detailed description.

Broadly stated, the present invention contemplates an improved spermicidal composition involving a novel combination of chemical substances including a spermicidal agent, a thickening agent and a plasticizing agent. The spermicidal agent which I have discovered is uniquely adapted to my novel spermicidal composition is a fatty diester of a polyoxyethylene glycol and is defined by the generic chemical formula:

$$CH_2OR_a(CH_2OCH_2)_xCH_2OR_b$$

in which "$x$" is two or more, "$R_a$" is an acyl radical having six or more carbon atoms, and "$R_b$" is an acyl radical of a fatty acid having six or more carbon atoms, and may be the acyl radical of the same fatty acid or a different fatty acid from that of "$R_a$". As a general rule, I use water to make up the balance of the composition. Under certain conditions, I may incorporate a pH buffering agent which is effective within a wide range of pH in the vaginal tract. Moreover, I prefer to incorporate a transparentizing agent in my novel composition to make the product transparent and appealing to the user. This transparentizing agent acts or operates by eliminating air inclusions, which would render the product opaque.

For the purpose of giving those skilled in the art a better understanding of the invention, the following illustrative examples are given:

*Example No. I*

| Agent | Chemical composition | Percentage |
|---|---|---|
| Spermicidal agent | Dodecaethylene (dodecaoxy-ethylene) glycol monolaurate mono-oleate. | 5 |
| Plasticizing agent | Glycerin | 10.5 |
| Thickening agent | Tragacanth | 2.5 |
| Preservative | Butyl-p-hydroxybenzoate | .02 |
| Transparentizing agent | Ethyl alcohol | 4.0 |
| Vehicle | Water | Balance |

Example No. II

| Agent | Chemical composition | Percentage |
|---|---|---|
| Spermicidal agent | Hexaoxyethylene glycol dioleate. | 10 |
| Plasticizing agent | Sorbitol | 5 |
| Thickening agent | Tragacanth (2.3%); Irish moss (1%). | 3.3 |
| Preservative | Propyl p-hydroxybenzoate | .2 |
| Transparentizing agent | Alcohol | 5.0 |
| Vehicle | Water | Balance |

Example No. III

| Agent | Chemical composition | Percentage |
|---|---|---|
| Spermicidal agent | Nonaoxyethylene glycol mono stearate, monolaurate (diester). | 8.0 |
| Plasticizing agent | Glycerin | 6.0 |
| Thickening agent | Tragacanth (2.5%); acacia (0.5%). | 3.0 |
| Preservative | Methyl p-hydroxybenzoate | .15 |
| Transparentizing agent | Alcohol | 5.0 |
| Vehicle | Water | Balance | other suitable means may be used.

Example No. IV

| Agent | Chemical composition | Percentage |
|---|---|---|
| Spermicidal agent | Dodecaoxyethylene glycol dilaurate. | 5.0 |
| Plasticizing agent | Glycerite of boroglycerin | 2.0 |
| Do | Glycerin | 7.0 |
| Thickening agent | Sodium carboxy methyl cellulose. | 2.5 |
| Preservative | Butyl p-hydroxybenzoate | .02 |
| Transparentizing agent | Alcohol | 4.0 |
| Vehicle | Water | Balance |

Example No. V

| Agent | Chemical composition | Percentage |
|---|---|---|
| Spermicidal agent | Polyoxyethylene glycol diester of the class consisting of caproic, capric, heptylic, caprylic, nonylic, lauric, myristic, palmitic, margaric, and stearic acids, and the corresponding unsaturated acids. | 10.0 |
| Plasticizing agent | Glycerin | 5.0 |
| Thickening agent | Tragacanth (3.0%); acacia (0.3%). | 3.3 |
| Preservative | Butyl p-hydroxybenzoate | .02 |
| Transparentizing agent | Alcohol | 5.0 |
| Vehicle | Water | Balance |
| (Boric acid is added for adjustment of pH to 5.0.) (pH 5.0). | | |

In these examples, the combination of plasticizing agent and thickener provide desirable adhesive action. The entire group of spermicidal agents likewise have desirable spreading power.

Example No. VI

| Agent | Chemical composition | Percentage |
|---|---|---|
| Spermicidal agent | Dodecaoxyethylene glycol diester of oleic acid and an acid of the class including caproic, heptylic, caprylic, nonylic, capric, lauric, myristic, palmitic, margaric and stearic acids and the corresponding unsaturated acids. | 10.0 |
| Plasticizing agent | Sorbitol | 5.0 |
| Thickening agent | Tragacanth (2.3%); Irish moss (1.0%). | 3.3 |
| Preservative | Propyl p-hydroxybenzoate | .2 |
| Transparentizing agent | Ethyl alcohol | 5.0 |
| Vehicle | Water | Balance |

Example No. VII

| Agent | Chemical composition | Percentage |
|---|---|---|
| Spermicidal agent | Nonaoxyethylene glycol monostearate, monoester of an acid including caproic, heptylic, caprylic, nonylic, capric, lauric, myristic, palmitic, margaric and stearic acids and the unsaturated acids corresponding thereto. | 8.0 |
| Plasticizing agent | Glycerin | 6.0 |
| Thickening agent | Tragacanth (2.5%); acacia (0.5%). | 3.0 |
| Preservative | Methyl p-hydroxybenzoate | .15 |
| Transparentizing agent | Ethyl alcohol | 5.0 |
| Vehicle | Water | Balance |

Example No. VIII

| Agent | Chemical composition | Percentage |
|---|---|---|
| Spermicidal agent | Diester of polyoxyethylene glycol of the formula $CH_2OR_a(CH_2OCH_2)_x CH_2OR_b$, in which "$x$" is an integer of at least 2, "$R_a$" is the acyl radical of a fatty acid having at least six carbon atoms, and "$R_b$" is the acyl radical of a fatty acid different from that of "$R_a$" and may be a saturated or unsaturated acid of at least six carbon atoms, as dodecaoxyethylene glycol monostearate, mono-oleate. | 10.0 |
| Thickening agent | Tragacanth | 2.5 |
| Plasticizing agent | Glycerin | 7.0 |
| Water-soluble buffer | Alkali in amount to adjust pH to 10.0. | |
| Vehicle | Water | Balance |

Example No. IX

| Agent | Chemical composition | Percentage |
|---|---|---|
| Spermicidal agent | Diester of dodecaethylene glycol monolaurate, monoacylate of a saturated acid of the group consisting of caproic, heptylic, caprylic, nonylic, capric, lauric, myristic, palmitic, margaric and stearic acids. | 8.0 |
| Plasticizing agent | Glycerin (3.0%) and sorbitol (3.0%). | 6.0 |
| Thickening agent | Tragacanth | 2.5 |
| Preservative | Butyl p-hydroxybenzoate | .02 |
| Creamy consistency former. | Cetyl alcohol | 5.0 |
| Vehicle | Water | Balance |

Example No. X

| Agent | Chemical composition | Percentage |
|---|---|---|
| Spermicidal agent | Diester of dodecaethylene glycol mono-oleate, monoacylate of an acid of the oleic series consisting of undecylenic, oleic and erucic acids. | 5.0 |
| Plasticizing agent | Propylene glycol (5%) and sorbitol (5%). | 10.0 |
| Thickening agent | Tragacanth (2.3%); Irish moss (1.0%). | 3.3 |
| Transparentizing agent | Ethyl alcohol | 5.0 |
| Creaming agent | Cetyl alcohol (1.0%); stearic acid (1.0%). | 2.0 |
| Preservative | Butyl p-hydroxybenzoate | .02 |
| Vehicle | Water | Balance |

I may give the product a white appearance or a creamy consistency by the use of such materials as cetyl alcohol or stearic acid or other cosmetic materials known to the arts for producing water-miscible opaque cosmetic creams, as exemplified in part in the above examples. Gums, natural or synthetic, may be substituted for gum tragacanth in the above examples, such as gums of the Arabin-type or the Bassorin type, for example, or synthetic gums produced by condensation of polymerization, such as sodium carboxymethyl cellulose and hydroxyethyl cellulose, for example, or mixtures thereof with gums having the desired properties, as will be understood by those skilled in the art. Water miscible fatty esters, propylene glycol, polyethylene glycols, sorbitol, or other humectants may be used in place of glycerol in substantially the same proportions.

In the foregoing examples, neither the spermicidal agent nor the other agents can function alone as a spermicidal composition. The spermicidal agent, as a 5% solution in water, for example, would not provide suitable mechanical barrier action, adhesiveness, or many of the other previously mentioned desiderata. The remaining agents would not provide spermatocidal activity. Only the entire novel combination will prove effective, non-irritant, and non-toxic. Other preservatives than butyl-p-hydroxybenzoate may be used, and the alcohol included in the above examples may be eliminated without detriment to the product.

For the purpose of demonstrating the effectiveness of my novel spermicidal composition and the shortness of time within which the composition operates, tests were made on the following compounds to detemrine the spermicidal time thereof. In these tests, the Brown and Gamble technique was used. For convenience, the spermicidal agent alone is listed in the following table with the spermicidal time, but the remaining agents were similar to those given in "Example No. I" above:

*Table No. I*

| Novel spermicidal diester composition containing— | Percentage | Spermicidal time |
|---|---|---|
| | | Minutes |
| Dodecaoxyethylene glycol monolaurate, monooleate | 5.0 | 5 |
| Polyoxyethylene glycol monolaurate, monooleate | 2.0 | 5 |
| Dodecaoxyethylene glycol dilaurate | 7.0 | 6 |
| Dodecaoxyethylene glycol dilaurate | 5.0 | 14 |
| Hexaoxyethylene glycol dioleate | 10.0 | 3 |
| Nonaoxyethylene glycol monostearate, monolaurate | 8.0 | 3 |
| Hexaoxyethylene glycol mono-oleate, monostearate | 2.0 | 3 |

The foregoing table clearly shows that the spermicidal times can be varied by the use of different diester spermicidal agent concentrations, but generally speaking, amounts of over 1% of the spermicidal agent are preferred. These tests further demonstrate that the novel spermicidal composition is spermicidally efficient by accepted testing techniques upon human sperm, upon which the tests were carried out. In additional biological, clinical and physical tests, it was demonstrated that the novel spermicidal composition possesses all the necessary desirable properties previously enumerated, and that the spermicidal agent is table, non-ionic, bland, neutral, nonoxidizing, non-coagulating, and non-irritating to mucous membranes.

Although several methods of preparing the spermicidal composition are possible, I prefer the following:

The spermicidal agent is melted and heated to about 60° C. and poured into water at the same temperature. The alcohol and preservative are separately mixed with the thickener, and plasticizer is then mixed in in the required amount. The entire mixture is then poured into water, while mixing, and mixing is continued until a homogeneous jelly is obtained.

Although the invention has been described in connection with preferred embodiments, it is to be understood that variations and modifications may be resorted to as will be apparent to those skilled in the art. Such variations and modifications are to be considered within the purview and scope of the claims appended hereto.

Having thus described the invention, what is claimed as new is:

1. An improved spermicidal jelly composition effective within a relatively short period of time without irritating delicate body membranes contacting therewith which comprises a spermicidal agent consisting of fatty acid diesters of polyoxyethylene glycols defined by the generic formula $CH_2OR_a(CH_2OCH_2)_xCH_2OR_b$, in which "$x$" is an integer of at least 2, "$R_a$" is the acyl radical of a fatty acid having at least six carbon atoms and "$R_b$" is the acyl radical of a fatty acid having at least six carbon atoms, a water dispersible thickening agent having adhesive action in the composition and a humectant plasticizing agent therefor, said composition being adapted for use in an aqueous vehicle.

2. An improved spermicidal jelly composition effective within a relatively short period of time without irritating delicate body membranes contacting therewith which comprises a spermicidal agent containing a polyoxyethylene glycol diester of the class consisting of caproic, heptylic, caprylic, nonylic, capric, lauric, myristic, palmitic, margaric, and stearic acids and the coresponding unsaturated acids, a water dispersible thickening agent having adhesive action in the composition and a humectant plasticizing agent therefor, said composition being adapted for use in an aqueous vehicle.

3. An improved spermicidal jelly composition effective within a relatively short period of time without irritating delicate body membranes contacting therewith which comprises a spermicidal agent consisting of fatty acid diesters of polyoxyethylene glycols defined by the general formula $CH_2OR_a(CH_2OCH_2)_xCH_2OR_b$, in which "$x$" is an integer of at least 2, "$R_a$" is the acyl radical of a fatty acid having at least six carbon atoms, and "$R_b$" is the acyl radical of lauric acid, a water dispersible thickening agent having adhesive action in the composition and a humectant plasticizing agent therefor, said composition being adapted for use in an aqueous vehicle.

4. An improved spermicidal jelly composition effective within a relatively short period of time without irritating delicate body membranes contacting therewith which comprises a spermicidal agent consisting of the diester of polyoxyethylene glycol of the formula $$CH_2OR_a(CH_2OCH_2)_xCH_2OR_b$$

in which "$x$" is an integer of at least 2, "$R_a$" is the acyl radical of a fatty acid having at least six carbon atoms and "$R_b$" is the acyl radical of a fatty acid different from that of "$R_a$" and may be a fatty acid of the group consisting of saturated fatty acids, and unsaturated fatty acids of the olefinic series having at least six carbon atoms, a water dispersible thickening agent having adhesive action in the composition and a humectant plasticizing agent therefor, said composition being adapted for use in an aqueous vehicle.

5. An improved spermicidal jelly composition effective within a relatively short period of time without irritating delicate body membranes contacting therewith which comprises a spermicidal agent consisting of fatty acid diesters of polyoxyethylene glycols defined by the generic formula $CH_2OR_a(CH_2OCH_2)_xCH_2OR_b$, in which "$x$" is an integer of at least 2, "$R_a$" and "$R_b$" are the acyl radicals of lauric acid, a water dispersible thickening agent having adhesive action in the composition and a humectant plasticizing agent therefor, said composition being adapted for use in an aqueous vehicle.

6. An improved spermicidal jelly composition effective within a relatively short period of time without irritating delicate body membranes contacting therewith which comprises a spermicidal agent consisting of the fatty acid diesters of polyoxyethylene glycols defined by the generic formula $CH_2OR_a(CH_2OCH_2)_xCH_2OR_b$, in which "$x$" is an integer of at least 2, and in which one of the groups "$R_a, R_b$" is the acyl radical of oleic acid and the other of said groups is the acyl radical of a fatty acid having at least six carbon atoms, a water dispersible thickening agent having adhesive action in the composition and a humectant plasticizing agent therefor, said composition being adapted for use in an aqueous vehicle.

7. An improved spermicidal jelly composition effective within a relatively short period of time without irritating delicate body membranes contacting therewith which comprises a spermicidal agent consisting of the fatty acid diesters of polyoxyethylene glycols defined by the generic formula $CH_2OR_a(CH_2OCH_2)_xCH_2OR_b$, in which "$x$" is an integer of at least 2, one of the groups "$R_a, R_b$" is the acyl radical of stearic acid and the other of said groups is the acyl radical of a fatty acid having at least six carbon atoms, a water dispersible thickening agent having adhesive action in the composition and a humectant plasticizing agent therefor, said composition being adapted for use in an aqueous vehicle.

8. An improved spermicidal jelly composition effective within a relatively short period of time without irritating delicate body membranes contacting therewith which comprises a spermicidal agent consisting of dodecaoxyethylene glycol dilaurate, a water dispersable thickening agent having adhesive action in the composition and a humectant plasticizing agent therefor, said composition being adapted for use in an aqueous vehicle.

9. An improved spermicidal jelly composition effective within a relatively short period of time without irritating delicate body membranes contacting therewith which comprises a spermicidal agent consisting of oleic acid diesters of polyoxyethylen glycols defined by the generic formula $CH_2OR_a(CH_2OCH_2)_xCH_2OR_b$, in which "$x$" is an integer of at least 2, and the groups "$R_a, R_b$" are the acyl radicals of oleic acid, a water-dispersible thickening agent having adhesive action in the composition and a humectant plasticizing agent therefor, said composition being adapted for use in an aqueous vehicle.

10. An improved spermicidal jelly composition effective within a relatively short period of time without irritating delicate body membranes contacting therewith which comprises a spermicidal agent consisting of dodecaoxyethylene glycol dilaurate, gum tragacanth as a thickening agent and glycerite of boroglycerin and glycerin as a humectant plasticizing agent therefor, together with butyl p-hydroxybenzoate as a preservative and alcohol as a transparentizing agent, said composition being adapted for use in an aqueous vehicle.

11. An improved spermicidal jelly composition effective within a relatively short period of time without irritating delicate body membranes contacting therewith which comprises a spermicidal agent consisting of the diester of dodecaethylene glycol monolaurate, monoacylate of a saturated acid of the group consisting of caproic, heptylic, caprylic, nonylic, capric, lauric, myristic, palmitic, margaric and stearic acids and the corresponding unsaturated acids, a water-dispersible thickening agent having adhesive action in the composition, a humectant plasticizing agent, and a transparentizing agent, said composition being adapted for use in an aqueous vehicle.

12. An improved spermicidal jelly composition effective within a relatively short period of time without irritating delicate body membranes contacting therewith which comprises a spermicidal agent consisting of the diester of dodecaethylene glycol mono-oleate, mono-acylate of an acid of the group consisting of caproic, heptylic, caprylic, nonylic, capric, lauric, myristic, palmitic, margaric, and stearic acids and the corresponding unsaturated acids, a water-dispersible thickening agent having adhesive action in the composition, a humectant plasticizing agent and a water-soluble buffer for adjusting the pH of the solution, said composition being adapted for use in an aqueous vehicle.

13. An improved spermicidal jelly composition effective within a relatively short period of time without irritating delicate body membranes contacting therewith which comprises a spermicidal agent consisting of fatty acid diesters of polyoxyethylene glycols defined by the generic formulae $CH_2OR_a(CH_2OCH_2)_xCH_2OR_b$, in which "$x$" is an integer of at least 2, "$R_a$" is the acyl radical of a fatty acid having at least six carbon atoms and "$R_b$" is the acyl radical of a fatty acid having at least six carbon atoms, a water dispersible thickening agent having adhesive action in the composition, a humectant plasticizing agent therefor and a buffering agent providing a pH within the acid range, said composition being adapted for use in an aqueous vehicle.

14. An improved spermicidal jelly composition effective within a relatively short period of time without irritating delicate body membranes contacting therewith which comprises a spermicidal agent consisting of fatty acid diesters of polyoxyethylene glycols defined by the generic formula $CH_2OR_a(CH_2OCH_2)_xCH_2OR_b$, in which "$x$" is an integer of at least 2, "$R_a$" is the acyl radical of a fatty acid having at least six carbon atoms and "$R_b$" is the acyl radical of a fatty acid having at least six carbon atoms, a water dispersible thickening agent having adhesive action in the composition, a humectant plasticizing agent therefor and a buffering agent providing a pH in the composition within the alkaline range, said composition being adapted for use in an aqueous vehicle.

ABRAHAM TAUB.

REFERENCES CITED

The following references are of record in the file of this patent:

UNITED STATES PATENTS

| Number | Name | Date |
|---|---|---|
| 2,467,884 | Elias | Apr. 19, 1949 |

OTHER REFERENCES

New and Nonofficial Remedies, 1951, J. B. Lippincott, Philadelphia, pages xxxi to xxxii.